United States Patent
Miyoshi

(10) Patent No.: US 8,110,740 B2
(45) Date of Patent: Feb. 7, 2012

(54) PHOTOELECTRODE SUBSTRATE OF DYE SENSITIZING SOLAR CELL, AND METHOD FOR PRODUCING SAME

(75) Inventor: Kozo Miyoshi, Kitamoto (JP)

(73) Assignee: Enplas Corporation, Saitama (JP)

( * ) Notice: Subject to any disclaimer, the term of this patent is extended or adjusted under 35 U.S.C. 154(b) by 796 days.

(21) Appl. No.: 11/500,021

(22) Filed: Aug. 7, 2006

(65) Prior Publication Data

US 2007/0034254 A1   Feb. 15, 2007

(30) Foreign Application Priority Data

Aug. 10, 2005 (JP) ................. 2005-231826

(51) Int. Cl.
  *H01L 31/00* (2006.01)
  *H01L 31/042* (2006.01)
  *H02N 6/00* (2006.01)
(52) U.S. Cl. .................... 136/263; 136/250; 136/252
(58) Field of Classification Search ............... 136/250, 136/263, 252
  See application file for complete search history.

(56) References Cited

U.S. PATENT DOCUMENTS

| | | | | |
|---|---|---|---|---|
| 3,961,962 A * | 6/1976 | Sato | ................ | 430/5 |
| 2002/0108649 A1 | 8/2002 | Fujimori et al. | | |
| 2005/0034755 A1 | 2/2005 | Okada et al. | | |
| 2005/0098205 A1 * | 5/2005 | Roscheisen et al. | ......... | 136/263 |
| 2005/0109391 A1 * | 5/2005 | Kobayashi | .................. | 136/263 |
| 2006/0162770 A1 * | 7/2006 | Matsui et al. | ............... | 136/263 |

FOREIGN PATENT DOCUMENTS

| | | |
|---|---|---|
| DE | 19841650 A1 | 3/2000 |
| JP | 56164583 A * | 12/1981 |
| JP | 5-504023 | 6/1993 |

OTHER PUBLICATIONS

Schmidt et al. ("Current-induced local oxidation of metal films: Mechanism adn quantum-size effects"). Applied Physics Letters, vol. 73, No. 15, Oct 1998.*
Human English translation of JP56-164583A.*
Bin Peng et al.; Interface Modifications in Solid-State Dye-Sensitized TiO2 Solar Cells; proceedings of SPIE, SPIE, USA; vol. 5215, No. 1, Aug. 8, 2003; pp. 60-70, XP-001193712; ISSN:0277-786X; DOI; DOI: 10.1117/12.509608.

* cited by examiner

*Primary Examiner* — Basia Ridley
*Assistant Examiner* — Lindsey Bernier
(74) *Attorney, Agent, or Firm* — Bachman & LaPointe, P.C.

(57) ABSTRACT

In a dye sensitizing solar cell 1 wherein an electrolyte 4 is filled in a space between a photoelectrode substrate 2 and a counter electrode of a counter electrode substrate 3, a composite film 7 comprising metal portions 7a of titanium or the like and oxide portions 7b thereof is formed on a transparent electrode film 6 formed on the surface of a substrate member 5, and a porous semiconductor electrode film 8 adsorbing or carrying sensitizing dyes 8a thereon is formed on the composite film 7, the metal portions 7a of the composite film 7 contacting the porous semiconductor electrode film 8, and the oxide portions 7b of the composite film 7 contacting the electrolyte 4 without contacting the porous semiconductor electrode film 8.

6 Claims, 4 Drawing Sheets

PHOTOELECTRODE SUBSTRATE OF DYE SENSITIZING SOLAR CELL, AND METHOD FOR PRODUCING SAME

BACKGROUND OF THE INVENTION

1. Field of the Invention

The present invention relates to a photoelectrode substrate for a dye sensitizing solar cell, and a method for producing the same. More specifically, the invention relates to a photoelectrode substrate for a dye sensitizing solar cell wherein an electrolyte is filled in a space between a counter electrode of a counter electrode substrate and the photoelectrode substrate, and a method for producing the same.

2. Description of the Prior Art

In recent years, from the point of view of environmental issues, solar cells for converting light energy to electric energy have been widely noticed. In particular, dye sensitizing solar cells have been widely noticed since the costs for producing them can be low. Conventional dye sensitizing solar cells are not intended for practical use since they have a low photoelectric transfer efficiency. Recently, there has been developed a technique for using a porous semiconductor electrode having a large surface area to cause the electrode to adsorb a large amount of dye to conspicuously enhance the photoelectric transfer efficiency of a dye sensitizing solar cell (see, e.g., Japanese Patent Unexamined Publication No. 5-504023 (National Publication of Translated Version of PCT/EP91/00734)).

As a conventional dye sensitizing solar cell using such a technique, there is known a dye sensitizing solar cell 101 which comprises a photoelectrode substrate 102, a counter electrode substrate 103, and an electrolytic solution 104 filled in a space therebetween, as schematically shown in FIG. 4. The photoelectrode substrate 102 of the dye sensitizing solar cell 101 comprises a substrate member 105, a transparent electrode film 106 formed on the surface 105a of the substrate member 105, and a porous semiconductor electrode film 108 of titanium oxide or the like formed on the transparent electrode film 106, the porous semiconductor electrode film 108 adsorbing a dye thereon. The porous semiconductor electrode film 108 is formed by a method comprising the steps of applying a suspension containing semiconductor particles on the transparent electrode film 106, and drying and burning it. The counter electrode substrate 103 of the dye sensitizing solar cell 101 comprises a counter substrate member 110, and a counter electrode 111 formed on the counter substrate member 110 by coating a catalyst such as platinum thereon. The substrate member 105 and the counter substrate member 110 are arranged so that the counter electrode 111 faces the porous semiconductor electrode film 108 at an interval. The electrolytic solution 104 is filled in the space between the counter electrode 111 and the porous semiconductor electrode film 108 to form the dye sensitizing solar cell 101. In the dye sensitizing solar cell 101, dye molecules adsorbed on the surface of the porous semiconductor electrode film 108 are designed to absorb light to inject electrons into a semiconductor to use the semiconductor electrode film 108 as a negative electrode to generate power.

However, in the above described conventional dye sensitizing solar cell 101, the movement of electrons from the porous semiconductor electrode film 108 to the transparent electrode film 106 occurs due to diffusion, so that the reverse movement of electrons from the transparent electrode film 106 to the semiconductor layer also occurs simultaneously. Therefore, the residence time of electrons in the porous semiconductor electrode film 108 is increased, so that there is a problem in that the probability of recombination of the electrons with the dye is increased to deteriorate the power generation characteristics of the dye sensitizing solar cell 101.

SUMMARY OF THE INVENTION

It is therefore an object of the present invention to eliminate the aforementioned problems and to provide a photoelectrode substrate for a dye sensitizing solar cell capable of preventing the reverse movement of electrons from a transparent electrode film of the photoelectrode substrate of the cell to a semiconductor layer thereof and preventing the quantity of light for photoelectric transfer from decreasing to improve the power generation characteristics of the cell, and a method for producing the same.

In order to accomplish the aforementioned and other objects, the inventor has diligently studied and found that it is possible to prevent the reverse movement of electrons from a transparent electrode film of a photoelectrode substrate for a dye sensitizing solar cell to a semiconductor layer thereof and prevent the quantity of light for photoelectric transfer from decreasing to improve the power generation characteristics of the cell, if a porous semiconductor electrode film is formed on a transparent electrode film via a composite film, which comprises a metal portion of a metal and an oxide portion of an oxide of the metal, in a dye sensitizing solar cell wherein an electrolyte is filled in a space between the transparent electrode film of the photoelectrode substrate and the counter electrode of a counter electrode substrate and wherein the porous semiconductor electrode film adsorbing or carrying a sensitizing dye thereon is formed on the transparent electrode film. Thus, the inventor has made the present invention.

According to one aspect of the present invention, a photoelectrode substrate for a dye sensitizing solar cell comprises: a substrate member; a transparent electrode film formed on the substrate member; a composite film formed on the transparent electrode film, the composite film comprising a metal portion of a metal and an oxide portion of an oxide of the metal; a porous semiconductor electrode film formed on the composite film; and a sensitizing dye adsorbed or carried on the porous semiconductor electrode film. In this photoelectrode substrate for the dye sensitizing solar cell, the porous semiconductor electrode film preferably contacts the metal portion of the composite film and does not contact the oxide portion thereof. The metal is preferably titanium or tantalum. The composite film preferably has a thickness of 1 to 100 nm.

According to another aspect of the present invention, a dye sensitizing solar cell comprises: the above described photoelectrode substrate; a counter electrode substrate having a counter electrode which faces the porous semiconductor electrode film of the photoelectrode substrate; and an electrolyte filled in a space between the counter electrode substrate and the photoelectrode substrate, wherein the oxide portion of the composite film contacts the electrolyte.

According to a further aspect of the present invention, there is provided a method for producing a photoelectrode substrate for a dye sensitizing solar cell, the method comprising the steps of: forming a transparent electrode film on a substrate member; forming a metal film on the transparent electrode film; forming a porous semiconductor electrode film on the metal film; oxidizing part of the metal film to form a composite film which comprises a metal portion of a metal and an oxide portion of an oxide of the metal; and causing the porous semiconductor electrode film to adsorb or carry a sensitizing dye thereon. In this method for producing a photoelectrode substrate for a dye sensitizing solar cell, the step of oxidizing the part of the metal film is preferably carried out by anodizing. In this case, the step of forming the composite film is preferably carried out after the step of forming the porous semiconductor electrode film on the metal film. Alternatively, the step of oxidizing the part of the metal film may be carried out by thermal oxidation, and the porous semiconductor electrode film may be formed by burning. In this case, the step of forming the composite film and the step of forming the porous semiconductor electrode film on the metal film may be simultaneously carried out. Moreover, the metal is preferably titanium or tantalum, and the metal film preferably has a thickness of 1 to 100 nm.

According to the present invention, a composite film comprising a metal portion of titanium or the like and an oxide portion of titanium oxide or the like (a transparent portion of an oxide) is formed on a transparent electrode film. The contact (the contact of a metal with a semiconductor) of the metal portion of the composite film with a porous semiconductor electrode film of titanium oxide or the like serves as a Schottky contact which provides rectification characteristics. In addition, a portion of the composite film, which does not contact the porous semiconductor electrode film, is a transparent oxide portion. Thus, it is possible to prevent the quantity of light for photoelectric transfer from decreasing. That is, in the metal portion of the composite film, electrons are easy to move from the porous semiconductor film toward the transparent electrode, whereas electrons are difficult to move in the reverse direction thereof. Thus, it is possible to prevent the reverse movement of electrons from the transparent electrode film to the semiconductor layer, and it is possible to decrease the probability of recombination of electrons with dye. In addition, it is possible to decrease the quantity of light for photoelectric transfer in the transparent oxide portion of the composite film, so that it is possible to improve the power generation efficiency of the solar cell.

According to the present invention, it is possible to provide a photoelectrode substrate for a dye sensitizing solar cell capable of preventing the reverse movement of electrons from a transparent electrode film of the photoelectrode substrate of the cell to a semiconductor layer thereof and preventing the quantity of light for photoelectric transfer from decreasing to improve the power generation characteristics of the cell.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiment of a photoelectrode substrate for a dye sensitizing solar cell and a method for producing the same according to the present invention will be described below in detail.

Figure 1:
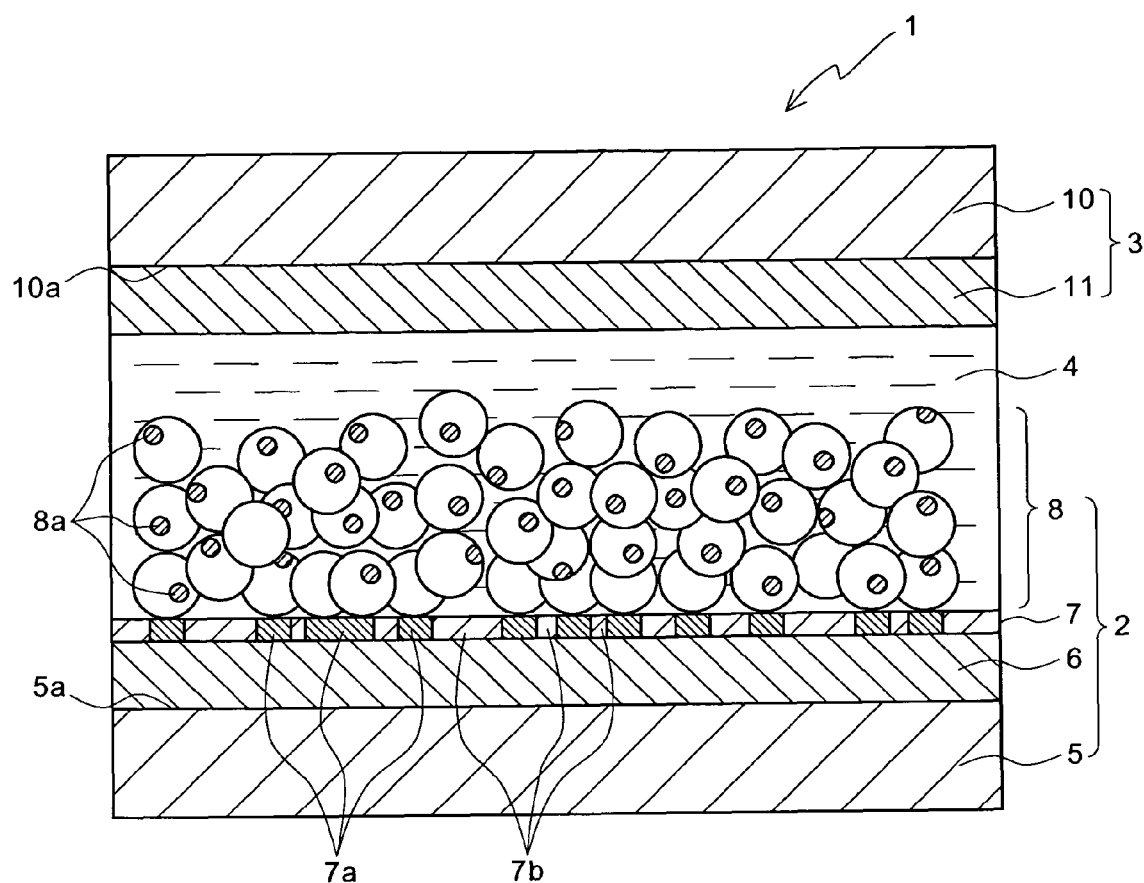
FIG. 1 is a schematic sectional view of a preferred embodiment of a dye sensitizing solar cell according to the present invention.

FIG. 1 schematically shows the preferred embodiment of a dye sensitizing solar cell according to the present invention. As shown in FIG. 1, the dye sensitizing solar cell 1 in this preferred embodiment comprises a photoelectrode substrate 2, a counter electrode substrate 3 and an electrolyte 4 filled in a space therebetween. The photoelectrode substrate 2 comprises: a transparent plastic substrate member 5; a transparent electrode film 6 formed on the surface 5a of the transparent plastic substrate member 5; a composite film 7 formed on the transparent electrode film 6; and a porous semiconductor electrode film 8, formed on the composite film 7, for adsorbing or carrying sensitizing dyes 8a thereon. The composite film 7 comprises metal portions 7a of titanium and oxide portions 7b of titanium dioxide ($TiO_2$). The metal portions 7a contact the porous semiconductor electrode film 8, and the oxide portions 7b contact the electrolyte 4 without contacting the porous semiconductor electrode film 8. The counter electrode substrate 3 comprises a plastic counter substrate member 10 and a counter electrode 11 formed on the surface 10a thereof. Furthermore, the substrate member 5 and the counter substrate member 10 may be made of a plastic, such as acrylic resin, polyethylene terephthalate (PET), polyethylene naphthalate (PEN), polyolefine or polycarbonate (PC).

The dye sensitizing solar cell 1 with the above described construction may be formed as follows.

Figure 2A:
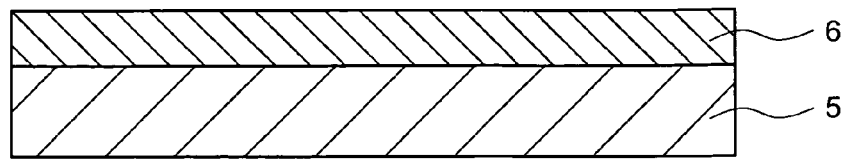
FIGS. 2A through 2D are schematic sectional views for explaining steps of producing a photoelectrode substrate for the dye sensitizing solar cell of FIG. 1.

First, as shown in FIG. 2A, a transparent electrode film 6 of indium-tin oxide (which will be hereinafter referred to as "ITO") is deposited on the surface 5a of a transparent plastic substrate member 5 of a photoelectrode substrate 2 by carrying out a sputtering process which uses plasma produced by a high-frequency discharge by using ITO as a target material in a vacuum device (not shown) into which argon gas and a very small amount of oxygen gas are fed.

Figure 2B:
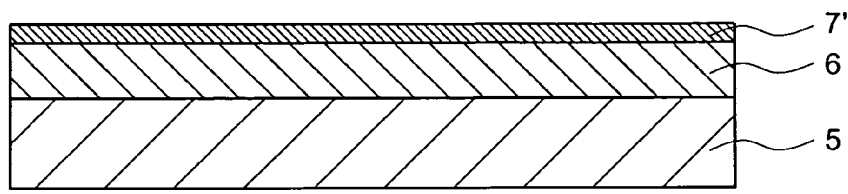

Then, the substrate member 5 having the transparent electrode film 6, together with titanium serving as a target material, is put into a vacuum device. Then, argon gas is fed into the vacuum device to carry out a sputtering process using plasma produced by a high-frequency discharge, so that a metal film 7' of titanium is formed on the transparent electrode film 6 as shown in FIG. 2B. If the deposition of titanium is sequentially carried out in the vacuum device, the metal film 7' can be stacked to be formed on the transparent electrode film 6 without forming any barrier layer of impurities or the like on the interface between the transparent electrode film 6 and the metal film 7'. Furthermore, the metal film 7' may be formed by the deposition or ion plating method in place of the sputtering method.

Figure 2C:
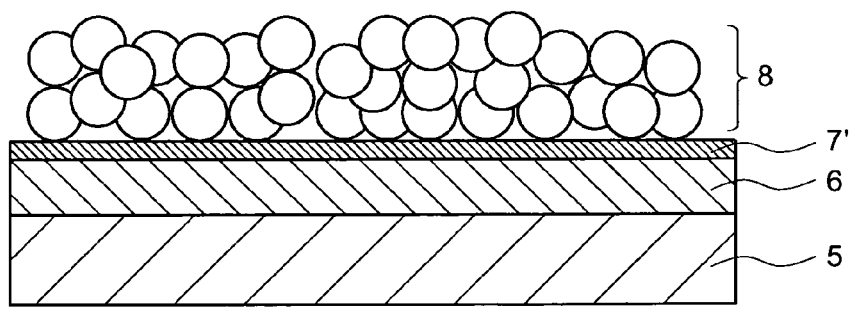

Then, as shown in FIG. 2C, a porous semiconductor electrode film 8 of titanium dioxide ($TiO_2$) is formed on the metal film 7' by burning. Furthermore, the porous semiconductor electrode film 8 may be formed of zinc oxide in place of titanium dioxide, and may be formed by the hydrothermal treatment method or the electrolytic deposition method in place of burning.

Figure 2D:
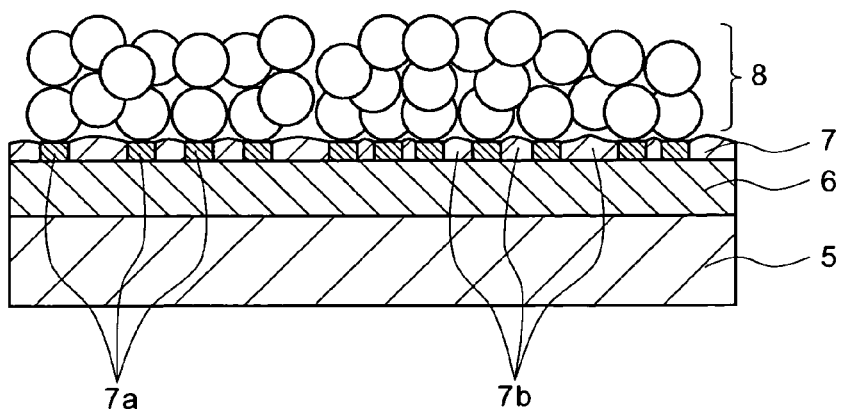

Then, the oxidation of the metal film 7' is carried out by the plasma anodizing method. The plasma anodizing is carried out by using plasma, which is produced by a high-frequency discharge while feeding oxygen gas into a vacuum device in which the substrate member 5 having the sequentially formed transparent electrode film 6, metal film 7' and porous semiconductor electrode film 8 is arranged as an anode. If the substrate member 5 is thus arranged as the anode, negative ions of oxygen enter the substrate member 5 to be combined with portions of the metal film 7', which are not covered with the porous semiconductor electrode film 8, to cause the portions of the metal film 7' to be titanium dioxide ($TiO_2$) portions. As a result, as shown in FIG. 2D, other portions of the metal film 7' covered with the porous semiconductor electrode film 8 are not oxidized as metal portions 7a, and the portions of the metal film 7', which are not covered with the porous semiconductor electrode film 8, are changed to oxide portions 7b, so that a composite film 7 comprising the metal portions 7a and the oxide portions 7b thereof is formed.

The oxidation of the metal film 7' by anodizing should not be limited to the above described plasma anodizing method, but a wet anodizing method may be used. When the oxidation of the metal film 7' is carried out by the wet anodizing method, a platinum electrode is arranged as a cathode, and the substrate member 5 is arranged as an anode so as to face the platinum electrode. The platinum electrode and the substrate member 5 are soaked in an electrolytic solution. Then, after the metal film 7' on the surface 5a of the substrate member 5 is electrically connected to the platinum electrode, a potential difference is produced between the metal film 7' of the substrate member 5 and the platinum electrode. Thus, hydrogen is produced from the platinum electrode, and oxygen is taken into the metal film 7', so that the portions of the metal film 7', which are not covered with the porous semiconductor electrode film 8, are changed to the oxide portions 7b (see FIG. 2D).

Each of the oxide portions 7b of titanium oxide or the like thus formed by the plasma or wet anodizing method (which will be hereinafter simply referred to as the "anodizing method") grows in a direction perpendicular to the surface of the metal film 7' in principle, so that it becomes a compact film having a uniform crystal orientation. The oxide portions 7b formed by the anodizing method have a crystal system (e.g., anatase-type) which has the same uniform direction of crystal growth as that of the porous semiconductor electrode film 8 which is used for the dye sensitizing solar cell 1.

Then, on the porous semiconductor electrode film 8, a sensitizing dye (e.g., ruthenium complex) having a photoelectric transfer function is adsorbed or carried.

Thus, the photoelectrode substrate 2 is formed by sequentially stacking the transparent electrode film 6, the composite film 7 and the porous semiconductor electrode film 8, which adsorbs or carries the sensitizing dye thereof, on the surface 5a of the substrate member 5.

On the other hand, as shown in FIG. 1, the counter electrode substrate 3 having a counter electrode 11 of platinum on the surface 10a of the counter substrate member 10 is formed by coating the surface 10a of the counter substrate member 10 with the counter electrode 11 of platinum. Furthermore, the counter electrode 11 may be formed of graphite in place of platinum.

The porous semiconductor electrode film 8 of the photoelectrode substrate 2 thus formed is arranged so as to face the counter electrode 11 of the counter electrode substrate 3 thus formed, and then, the electrolyte 4 is filled in a space between the porous semiconductor electrode film 8 and the counter electrode 11 to complete the dye sensitizing solar cell 1 in this preferred embodiment (see FIG. 1). Furthermore, as the electrolyte 4, a redox electrolytic solution containing an oxidation-reduction pair, such as an iodine-iodine compound or a bromine-bromine compound, may be usually used.

In the dye sensitizing solar cell 1 thus formed, if sunlight is incident on the photoelectrode substrate 2 from the outside, the sensitizing dyes 8a adsorbed or carried on the porous semiconductor electrode film 8 are excited so that electrons are transferred to an excited state from an electronic ground state. The electrons of the excited sensitizing dyes 8a are injected into the conduction band of $TiO_2$ forming the porous semiconductor electrode film 8, to move to the transparent electrode film 6 via the composite film 7 which comprises the metal portions and oxide portions thereof, and then, to move from the transparent electrode film 6 to the counter electrode 11 via an external circuit (not shown). The electrons moving to the counter electrode 11 are designed to reduce triiodide ions in the electrolyte 4 as iodide ions (if a redox electrolytic solution containing an iodine-iodine compound is used as the electrolyte 4). The iodide ions thus reduced are oxidized again by the sensitizing dyes to return the electrons to the sensitizing dyes. Such an operation is repeated to extract electric energy.

In the above described dye sensitizing solar cell 1 in this preferred embodiment, the metal portions 7a of titanium of the composite film 7 formed on the transparent electrode film 6 contact the porous semiconductor electrode film 8 as the Schottky contact to provide rectification characteristics. That is, electrons are easy to move from the porous semiconductor electrode film 8 to the transparent electrode film 6, whereas electrons are difficult to move in the reverse direction thereof. Thus, it is possible to prevent the reverse movement of electrons from the transparent electrode film 6 to the semiconductor layer, and it is possible to decrease the probability of recombination of the electrons with the dyes.

In the photoelectrode substrate 2 for the dye sensitizing solar cell 1 in this preferred embodiment, the metal portions 7a of the composite film 7 are made of a material capable of reflecting and absorbing visible light. However, the size of each of the metal portions 7a (in directions parallel to a plane of the composite film 7 facing the porous semiconductor electrode film 8) depends on the particle size (about tens nanometers) of titanium dioxides ($TiO_2$) forming the porous semiconductor electrode film 8, and is far smaller than the wavelength of visible light which is in the range of from 380 nm to 770 nm, so that the quantity of light reflected on and absorbed into the metal portions 7a of the composite film 7 can be ignored in comparison with the quantity of light passing through the composite film 7. In addition, the oxide portions 7b of the composite film 7 are made of a transparent material, such as titanium oxide, through which incident light can sufficiently pass. Therefore, the photoelectrode substrate 2 in this preferred embodiment has a transmittance which is substantially equal to that of a conventional photoelectrode substrate on which the composite film 7 is not formed. Furthermore, if the size of each of the metal portions 7a of the composite film 7 is not far smaller than the wavelength of visible light, incident light is reflected on and absorbed into the metal portions 7a, so that the thickness of the composite film 7 is preferably in the range of from 1 nm to 100 nm and more preferably in the range of from 2 nm to 20 nm.

According to the dye sensitizing solar cell 1 in this preferred embodiment, each of the oxide portions (the portions of titanium oxide) 7b of the composite film 7 formed on the transparent electrode film 6 by the anodizing method is a crystalline (e.g., anatase-type) $TiO_2$ film having a uniform direction of crystal growth, and has a lower value of electric resistance than that of a titanium oxide film formed by a sputtering or sol-gel method. In addition, it is possible to prevent electric pin holes from being formed. As a result, according to the dye sensitizing solar cell 1 in this preferred embodiment, it is possible to smoothly carry out the charge-transfer from the porous semiconductor electrode film 8 to the transparent electrode film 6, and it is possible to prevent a short-circuit, which is caused by electric pin holes between the transparent electrode film 6 and the electrolyte 4, without damaging the power generation characteristics of the dye sensitizing solar cell 1, so that it is possible to prevent a leak current from being produced.

While the substrate member 5 and the counter substrate member 10 have been made of a plastic material in the dye sensitizing solar cell 1 in this preferred embodiment, they may be made of a glass.

Since the dye sensitizing solar cell 1 in this preferred embodiment is designed to cause sunlight to be incident on the substrate member 5, the substrate member 5 is made of a transparent plastic material having an excellent light permeability, so that it is not always required that the counter substrate member 10 is made of a plastic material having an excellent light permeability. However, when the dye sensitizing solar cell 1 is designed to cause sunlight to be incident on the counter substrate member 10, it is required that the counter substrate member 10 is made of a plastic material having an excellent light permeability and that the counter electrode 11 is transparent. Thus, if the dye sensitizing solar cell 1 is designed to cause sunlight to be incident on the counter substrate member 10, the substrate member 5 and the transparent electrode film 6 may be made of a material having a bad light permeability.

While the metal film of titanium has been used in the method for producing the photoelectrode substrate 2 for the dye sensitizing solar cell 1 in this preferred embodiment, it is possible to obtain the same effects if the metal film of tantalum is used. The contact of each of these two metals (titanium and tantalum) with the porous semiconductor electrode film serves as a Schottky contact. In addition, the metals have a high corrosion resistance, and are not corrode with iodine ions in the electrolyte.

Moreover, while anodizing has been used for oxidizing the part of the metal film 7' to form the composite film 7 in the method for producing the photoelectrode substrate 2 for the dye sensitizing solar cell in this preferred embodiment, thermal oxidation may be used in place of anodizing. In this case, if the heating temperature during thermal oxidation is set to be 400 to 500° C., the step of burning and forming the porous semiconductor electrode film 8 on the metal film 7', and the step of oxidizing the part of the metal film 7' to form the composite film 7 can be simultaneously carried out as one step.

EXAMPLE

An example of a photoelectrode substrate for a dye sensitizing solar cell and a method for producing the same according to the present invention will be described below in detail.

First, there was prepared a substrate member with ITO film wherein a transparent electrode film of ITO (ITO film) 6 was formed on the surface of a substrate member 5 of polyethylene naphthalene (PEN) (the plate member having a rectangular planar shape, each side having a length of 5 cm, and the plate member having a thickness of 125 μm and a value of electric resistance of 10Ω/□) (see FIG. 2A). The substrate member with ITO film, together with titanium serving as a target material, was arranged in a vacuum device into which argon gas was fed at 50 sccm. Then, a sputtering process using plasma produced on the surface of the target material by a high-frequency discharge (13.56 MHz, 400 W) was carried out for sixty seconds to form a metal film (titanium film) 7' having a thickness of 10 nm on the surface of the ITO film 6 (see FIG. 2B).

Then, a titania application paste for low-temperature deposition was applied on the titanium film 7' so as to have a thickness of 50 μm, and was heated at 150° C. for five minutes to form a porous semiconductor electrode film 8 having a thickness of 5 μm on the titanium film 7' (see FIG. 2C).

Then, a platinum electrode was arranged as a cathode of an anodizing bath in which an electrolytic solution (a liquid formed by adding 0.1 g of ammonium dihydrogenphosphate to 1 L of pure water) was filled, and the substrate member with ITO film, on which the titanium film 7' and porous semiconductor electrode film 8 were formed, was arranged as an anode of the anodizing bath. Then, the titanium film 7' of the anode was electrically connected to the platinum electrode to cause a potential difference between the cathode and the anode. The potential difference between the cathode and the anode was gradually increased from 0 V to 5 V in one minute, and the voltage of 5 V was maintained after it reaches 5V. In this anodizing process, the current value decreases as the increase of the thickness of the oxide portions 7b of titanium oxide formed on the titanium film 7' by anodizing. The anodizing process was continued until the decrease of the current value was stopped. By carrying out such an anodizing process, the crystalline (e.g., anatase-type) oxide portions 7b having the uniform direction of crystal growth were formed on portions which were not covered with the porous semiconductor electrode film 8 (see FIG. 2D).

Then, the porous semiconductor electrode film 8 was caused to adsorb a ruthenium complex dye. Thus, there was completed a photoelectrode substrate 2 wherein the composite film 7 comprising the metal portions 7a and the oxide portions 7b thereof was formed on the ITO film 6 and wherein the porous semiconductor electrode film 8 adsorbing or carrying the sensitizing dye thereon was stacked to be formed on the composite film 7.

Figure 3:
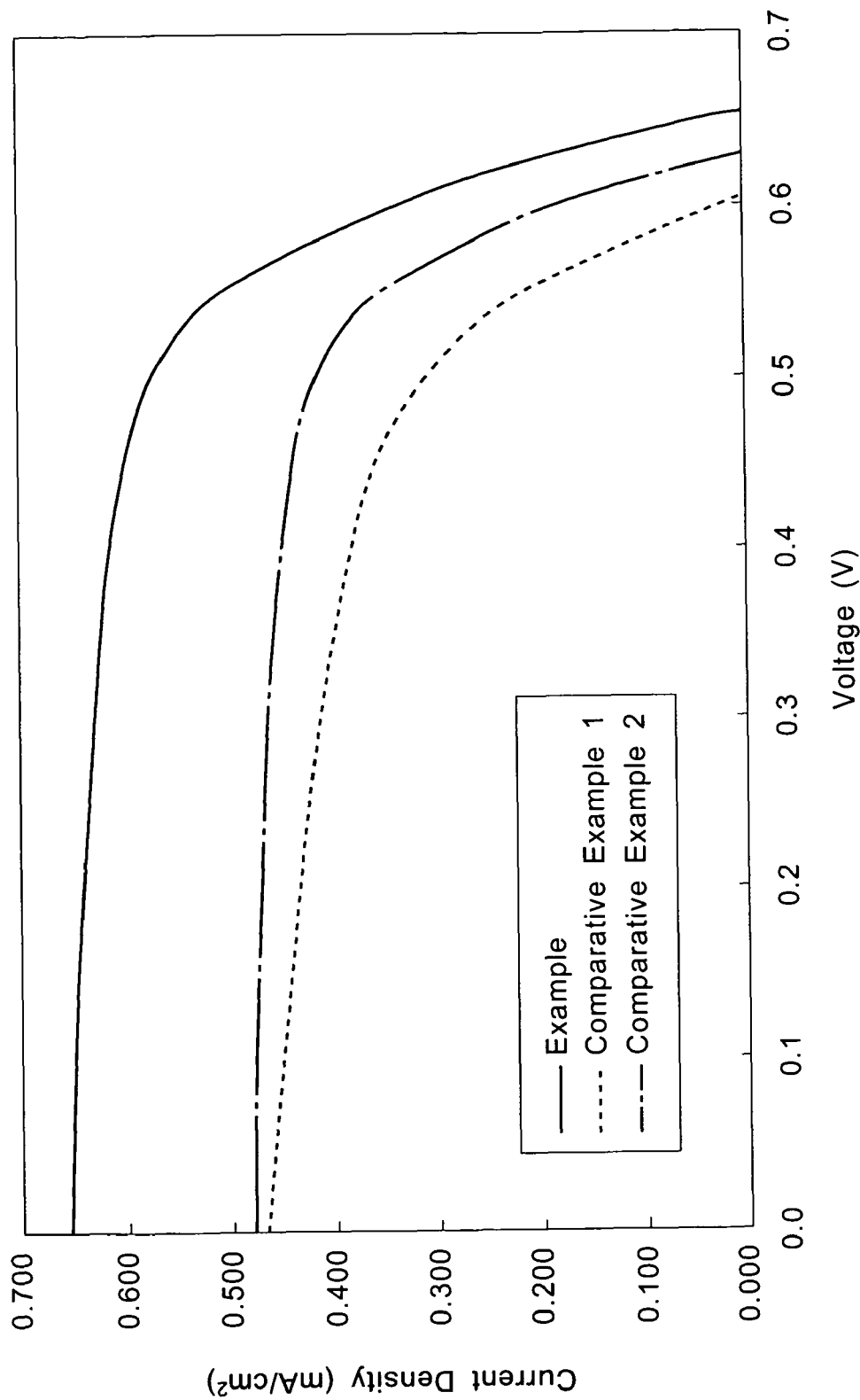
FIG. 3 is a graph showing the results of experiments on the current/voltage characteristics of a dye sensitizing solar cell in Example, in comparison with those of dye sensitizing solar cells in Comparative Examples 1 and 2.
Figure 4:
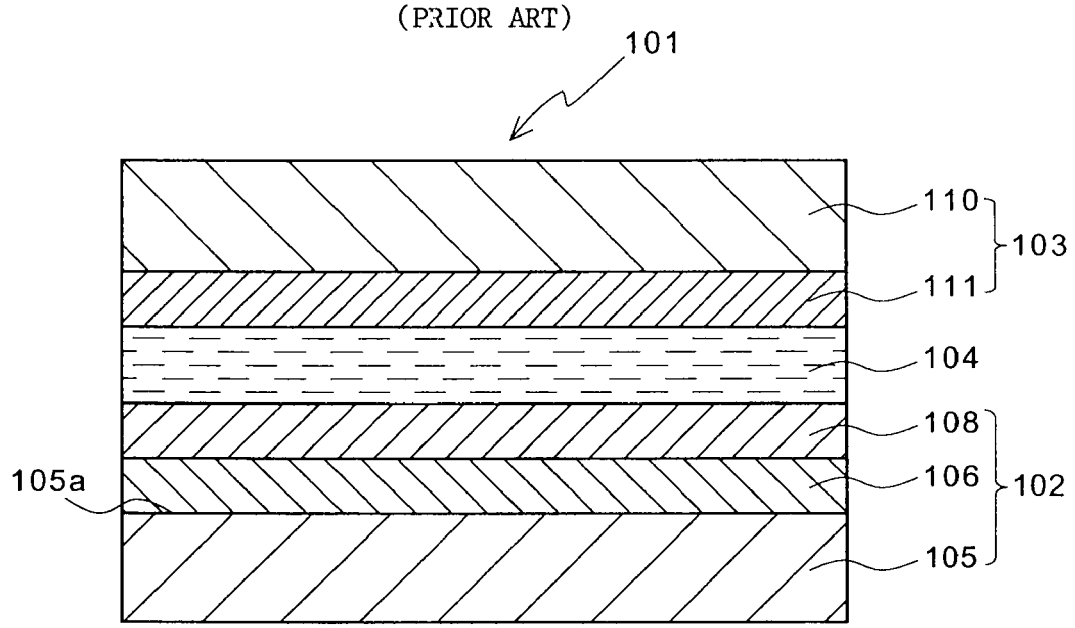
FIG. 4 is a schematic sectional view of a conventional dye sensitizing solar cell.

The dye sensitizing solar cell 1 using the photoelectrode substrate 2 thus produced was irradiated with pseudo sunlight having a light irradiation energy of 10 mW/cm$^2$ by means of a solar simulator to carry out a cell characteristic test. As Comparative Example 1, there was produced a conventional dye sensitizing solar cell 101 (shown in FIG. 4) having the same construction as that in Example, except that the composite film 7 was not formed. As Comparative Example 2, there was produced a dye sensitizing solar cell (not shown) having the same construction as that in Example, except that a titanium film 7' was formed in place of the composite film 7. With respect to the dye sensitizing solar cells in Comparative Examples 1 and 2, the same cell characteristic tests as that in Example were carried out. The results are shown in FIG. 3 and Table. FIG. 3 shows the results of experiments on the current/voltage characteristics of the dye sensitizing solar cell 1 in Example, in comparison with those of the dye sensitizing solar cell 101 in Comparative Examples 1 and the dye sensitizing solar cell in Comparative Example 2. In Table, Isc denotes a current (short-circuit current) flowing between the output terminals of a dye sensitizing solar cell when the output terminals are short-circuited, and Voc denotes a voltage (open-circuit voltage) when the output terminals of the dye sensitizing solar cell are open. In addition, f.f. denotes a value (curve factor or fill factor=Pmax/Voc·Jsc) obtained by dividing the maximum output Pmax (=Imax·Vmax) by a product of the open-circuit voltage Voc and a current density Jsc (a short-circuit current Isc per 1 cm$^2$), and η denotes a value (conversion efficiency) indicated as percent by multiplying a value, which is obtained by dividing the maximum output Pmax by the quantity (W) of irradiation light (per 1 cm$^2$), by 100.

TABLE

|  | Comparative Example 1 | Comparative Example 2 | Example |
|---|---|---|---|
| Isc (mA) | 0.468 | 0.482 | 0.656 |
| Voc (V) | 0.604 | 0.629 | 0.653 |
| f.f. | 0.573 | 0.683 | 0.674 |
| η (%) | 1.62 | 2.47 | 2.89 |

As shown in FIG. 3 and Table, in the dye sensitizing solar cell in Comparative Example 2, the short-circuit current is substantially equal to that in the dye sensitizing solar cell 101 in Comparative Example 1, but the fill factor is enhanced to be about 1.2 times as large as that in the dye sensitizing solar cell 101 in Comparative Example 1, so that the conversion efficiency is enhanced to be about 1.5 times as large as that in the dye sensitizing solar cell 101 in Comparative Example 1. It is considered that such differences in performance between the dye sensitizing solar cell in Comparative Example 2 and the dye sensitizing solar cell 101 in Comparative Example 1 are caused by rectification characteristics resulting from the titanium film of the photoelectrode substrate in Comparative Example 2. That is, it is considered that the titanium film (the metal portions 7a of the composite film 7) exists between the titanium film being the porous semiconductor electrode film 8 and the ITO film being the transparent electrode film 6 to cause the contact of the titanium oxide film with the titanium film to serve as a Schottky contact to provide rectification characteristics. On the other hand, it is considered that the photoelectrode substrate 102 in Comparative Example 2 allows current to flow in a reverse direction since it is not possible to prevent the reverse movement of electrons from the ITO film 106 to the semiconductor layer.

As shown in FIG. 3 and Table, in the dye sensitizing solar cell 1 in Example, the short-circuit current is enhanced to about 1.4 times as large as that of the dye sensitizing solar cell 101 in Comparative Example 1 and the dye sensitizing solar cell in Comparative Example 2. In addition, the fill factor is substantially equal to that of the dye sensitizing solar cell in Comparative Example 2, but it is enhanced to be about 1.2 times as large as that of the dye sensitizing solar cell 101 in Comparative Example 1. As a result, the conversion efficiency is enhanced to be about 1.8 times as large as that of the dye sensitizing solar cell 101 in Comparative Example 1, and is enhanced to be about 1.2 times as large as that of the dye sensitizing solar cell in Comparative Example 2. It is considered that such improvement of performance of the dye sensitizing solar cell 1 in Example is caused by the light permeability of the composite film 7 in addition to rectification characteristics resulting from the metal portions 7a of the composite film 7 similar to the titanium film in Comparative Example 2.

If a plurality of dye sensitizing solar cells, each of which has a photoelectrode substrate according to the present invention, are connected to each other in series, or if a plurality of solar cell series, each of which is formed by connecting the plurality of dye sensitizing solar cells to each other in series, are connected to each other in parallel to form a dye sensitizing solar cell assembly, it is possible to obtain desired electric energy.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A dye sensitizing solar cell comprising:
   a photoelectrode substrate comprising:
      a substrate member;
      a transparent electrode film formed on the substrate member;
      a composite film formed on the transparent electrode film, said composite film comprising metal portions of a metal and transparent oxide portions of an oxide of the metal;
      a porous semiconductor electrode film formed on the composite film; and
      a sensitizing dye adsorbed or carried on the porous semiconductor electrode film, wherein contacting portions of said porous semiconductor electrode film with said composite film directly contact the metal portions of the composite film without directly contacting said transparent oxide portions thereof;
   a counter electrode substrate having a counter electrode which faces the porous semiconductor electrode film of the photoelectrode substrate; and an electrolyte filled in a space between the counter electrode substrate and the photoelectrode substrate,
   wherein said transparent oxide portions of the composite film directly contact said electrolyte.

2. A dye sensitizing solar cell as set forth in claim 1, wherein said metal is titanium.

3. A dye sensitizing solar cell as set forth in claim 1, wherein said metal is tantalum.

4. A dye sensitizing solar cell as set forth in claim 1, wherein said composite film has a thickness of 1 to 100 nm.

5. A dye sensitizing solar cell as set forth in claim 1, wherein said contacting portions of said porous semiconductor electrode film with said composite film directly contact said metal portions of the composite film for forming a Schottky contact which provides rectification characteristics, and wherein said transparent oxide portions of said composite film, which do not directly contact said porous semiconductor electrode film, are transparent portions for preventing the quantity of light for photoelectric transfer from decreasing.

6. A dye sensitizing solar cell comprising:
   a photoelectrode substrate comprising:
      a substrate member;
      a transparent electrode film formed on the substrate member;
      a composite film formed on the transparent electrode film, said composite film comprising metal portions of a metal and transparent oxide portions of an oxide of the metal;
      a porous semiconductor electrode film formed on the composite film, the porous semiconductor electrode film directly contacting the metal portions of the composite film while being prevented from directly contacting the transparent oxide portions of the composite film so as to allow incident light to pass through the transparent oxide portions thereof; and a sensitizing dye adsorbed or carried on the porous semiconductor electrode film;
   a counter electrode substrate having a counter electrode which faces the porous semiconductor electrode film of the photoelectrode substrate; and an electrolyte filled in a space between the counter electrode substrate and the photoelectrode substrate, wherein said transparent oxide portions of the composite film directly contact said electrolyte.

* * * * *